United States Patent

Ogasawara

[15] 3,672,200
[45] June 27, 1972

[54] MACHINE TOOL

[72] Inventor: Sadanori Ogasawara, Nakashim-gun, Japan

[73] Assignee: Aikoku Kogyo Kabushiki Kaisha, Nakashima-gun, Aichi, Pref., Japan

[22] Filed: Dec. 23, 1970

[21] Appl. No.: 100,947

[30] Foreign Application Priority Data

Dec. 24, 1969 Japan..................................44/1386
Nov. 14, 1970 Japan...............................45/100621

[52] U.S. Cl.................................................72/285, 72/297
[51] Int. Cl..............................................................B21c 3/12
[58] Field of Search....................72/274, 285, 297, 398, 377, 72/253

[56] References Cited

UNITED STATES PATENTS

3,195,331  7/1965  Curtis et al. ...............................72/285
3,290,916  12/1966  Louis et al. ...............................72/285
345,816  7/1886  Tilghman...................................72/297

Primary Examiner—Charles W. Lanham
Assistant Examiner—Michael J. Keenan
Attorney—Waters, Roditi, Schwartz & Nissen

[57] ABSTRACT

A machine tool, e.g., an extruder or a push bench, for processing a long work-piece, which machine tool comprises a pair of holder members, each including a center pin for holding either longitudinal end of said long work-piece by engaging one of center holes prebored on opposite edge surfaces of the work-piece, a die capable of shaping said work-piece, and a hydraulic piston-cylinder device for moving said die while causing the die to operatively engage the work-piece. The hydraulic piston-cylinder device includes a driving portion for actuating the die and a compensating portion for selectively releasing the stress in the work-piece during the working by the die.

4 Claims, 14 Drawing Figures

MACHINE TOOL

The invention relates to a machine tool for working an extendedly long work-pieces such as a steel bar into a splined shaft, fluted rod, axially thick pinion or gear and the like by means of a die to be axially moved relative to said long work-piece, and more particularly to an extruding machine or push bench comprising two holder members respectively having its center pin for holding said long work-piece engaged with each center hole previously formed in the opposite ends of said work-piece and a die adapted to be forcedly moved along on said work-piece by means of a hydraulic piston-cylinder device so as to work said work-piece in said products.

A conventional process of shaping or extruding long work-pieces, such as splined shafts, fluted rods, axially thick pinion and the like, has a shortcoming in that the work-piece or the semi-finished product which is to be machined tends to bend during the machining process.

It is well known that, although the art of cold forging process has recently been studied extensively for the sake of rationalizing or simplifying machining process and improving the accuracy of the products, the cold forging process has not been used in actual industrial production due to the bending of the work-piece during the process.

Causes of such bending of the work-piece are considered to be in the difference of the angles of the longitudinally opposing edge surfaces of the long work-piece, uneven distribution of flat portions in the work-piece and uneven distribution of hardness in the material of the work-piece. The inventors have found that such bending of the work-piece can completely be eliminated, by suitably controlling the holding pressure applied to the center holes bored at the longitudinally opposite ends of the work-piece. Such control of the holding pressure, however, has been impossible with conventional machine tools, because each work-piece is held by stationary holders at the longitudinally opposite ends thereof despite that the work-piece itself tends to elongate due to the working force applied by the machining tool.

Therefore, an object of the present invention is to obviate the aforesaid difficulties of the conventional machine tools for machining a long work-piece, by providing an improved machine tool, whereby increasing the accuracy of the products and simplifying the machining process. With the machine tool according to the present invention, the bending of the work-piece is prevented by holding the work-piece with a constant holding pressure, regardless of the elongation of the work-piece during the machining operation, which holding pressure is applied to the longitudinally opposite ends of the work-piece at prebored center holes by a suitable hydraulic piston-cylinder device. Furthermore, according to the present invention, a die for the machining operation may be moved relative to the work-piece, in the so-called floating fashion, so as to ensure accurate machining even when the work-piece is slightly bent.

Other objects and advantages of the present invention may be appreciated by referring to the following description, taken in conjunction with the accompanying drawings, in which:

FIG.1-A is a lateral view of a die to be used in the machine tool of FIG.1;

FIG.7-A is an end view of a die to be used in the machine tool of FIG.7;

FIG.9-A is a lateral sectional view of the work-piece after being machined;

Figure 1:
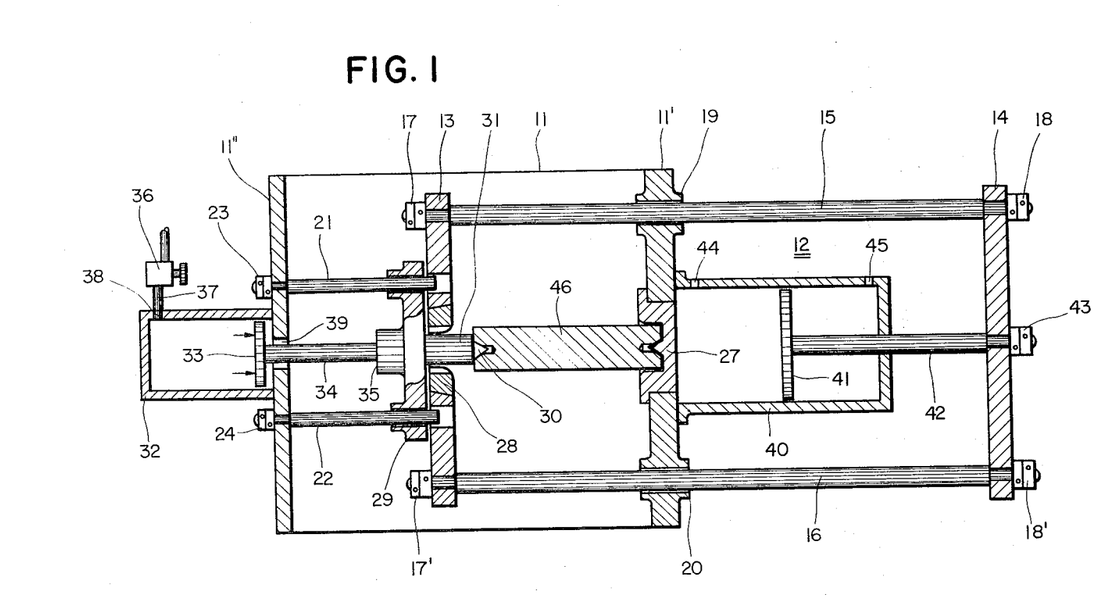
FIG. 1 is partly sectioned schematic plan view of a machine tool embodying the present invention.

Referring to FIG.1, showing an embodiment of the present invention, a machine frame 11 supports a reciprocating frame-work 12 including a die holder or left-hand end member of the reciprocating framework 13 and a flange or a right-hand end member of said frame-work 14 which are secured to connector rods or beams for connecting said two end members of said machine frame 15 and 16 by suitable joints 17, 17', 18 and 18', e.g., nuts, with a spacing therebetween. The connector rods 15 and 16 of the reciprocating frame-work 12 are slidably held by guide bearings 19 and 20 integrally formed on a right-hand upright support wall or support member 11' secured to the machine frame 11. The diameter of the rods 15 and 16 is slightly smaller than the inner diameter of the guide bearings 19 and 20, so as to allow smooth reciprocation of the frame-work 12 while causing a die 28 carried by the die holder 13 of the frame-work 12 to operatively engage a work-piece 46 for machining.

A left-hand upright support wall or support member 11" is secured to the machine frame 11 in parallel with the right-hand support wall 11', and a pair of guide rods 21 and 22 extending toward the right-hand wall 11' are fastened to the left-hand support wall 11" by suitable joints 23 and 24, e.g., nuts, with a spacing therebetween. The guide rods 21, 22 act to guide the movement of a center holder 29 holding the neck portion 31 of a movable holder member 30. The outer diameter of the neck portion 31 is smaller than the minimum diameter $d$ of the die 28, such as a spline die shown in FIG.1-A. The movable holder member 30 holds one end of the work-piece 46 with substantially constant pressure by moving together with the holder member 29, as will be described hereinafter. A fixed holder member 29 secured to the right-hand support wall 11' holds the opposite end of the work-piece 46, so as to cooperate with the movable holder member 30 in holding the work-piece 46 at its opposite edge.

As shown in FIG.1-A, the die 28 carried by the die holder 13 of the reciprocating frame-work 12 has tooth forms 28' for shaping the work-piece 46 into desired shape, for instance, into a splined shaft, axially thick gear, fluted rod and the like.

Each work-piece 46 to be machined by the die 28 in the machine tool of the present invention is provided with center holes formed at the longitudinally opposing edge surfaces thereof. When the die 28, as shown in FIG.1-A, is used, the work-piece 46 is prepared in a cylindrical form with an outer diameter substantially equivalent to or slightly smaller than the maximum inner diameter D of the die 28 as shown in FIG.1-A.

An auxiliary ram cylinder 32, is secured to the left-hand support wall 11" on its opposite surface to the right-hand support wall 11'. A piston 33 is operatively disposed in the cylinder 32, and the center holder 29 is connected to the piston 33 through a piston rod 34. A stopper 35 may be provided at the junction between the piston rod 34 and the center holder 29. Thus, the movable holder member 30 carried by the center holder 29 reciprocates in response to the movement of the piston 33 in the cylinder 32.

The cylinder 32 for the auxiliary ram has a pressure-liquid passage 38, to which a pressure-fluid conduit 37 is connected through a checking constant-pressure valve or check valve 36. The valve 36 acts to keep the inside operating pressure of the cylinder 32 at a constant level. A vent hole 39 is provided to expose the joint of the piston 33 and the piston rod 34 to the atmospheric pressure.

The cylinder 40 for a main ram is mounted on the right-hand support wall 11' on its surface opposite to the left-hand wall 11''. A piston 41 in the cylinder 40 is connected to one end of a piston rod 42, and the opposite end of the rod 42 is secured to the flange 14 of the reciprocating frame-work 12 by a suitable joint 43, such as double nuts. Thus, the reciprocating frame-work 12 travels back and forth in response to the movement of the piston 41, which is driven in the cylinder 40 by the hydraulic pressure, so that the die 28 is operatively actuated by the hydraulic pressure acting on the piston 41. The piston 41 defines two pressure chambers in the cylinder 40, each having a fluid passage 44 or 45 for receiving pressure liquid, as shown in FIG.1.

The axes of the main and auxiliary hydraulic jacks, or the axes of the piston rods 34 and 42, are aligned with each other, and the movable holder member 30 and the fixed holder member 27 are aligned with the axes of the two pistons 34 and 42.

In operation of the machine tool of the aforesaid construction, according to the present invention, the work-piece 46 having center holes preformed at the opposite end surfaces thereof is mounted on the machine tool by engaging one end to the fixed holder member 27 and then delivering pressure fluid into the piston 32 through the passage 38 and the checking constant-pressure valve 36 for shifting the movable holder member 30 toward the fixed holder member 27 through the piston 33, piston rod 34, and the center holder 29, until the movable holder member 30 operatively engages the center hole bored at the opposite end of the work-piece 46. FIG.1 illustrates the work-piece 46 thus mounted. As pointed out in the foregoing, in the case of splining by the die of FIG.1-A, the outer diameter of the work-piece 46 is made equivalent to or slightly smaller than the maximum inner diameter D of the die 28, before being mounted on the machine tool.

Figure 2:
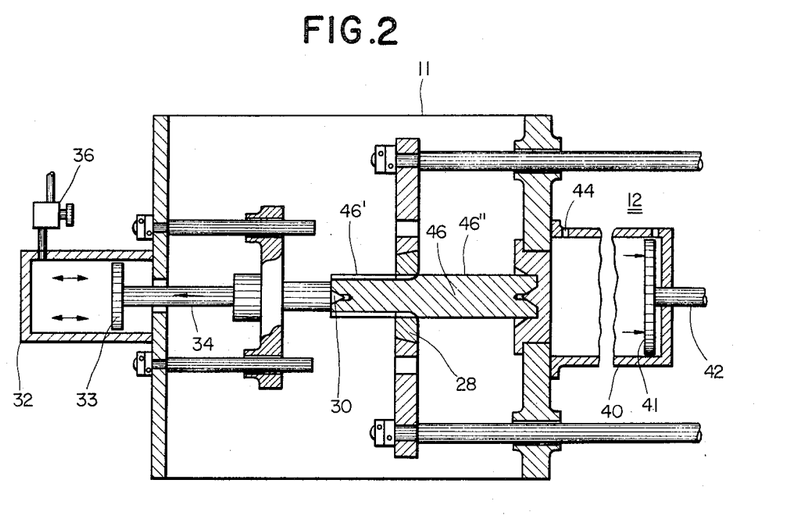
FIG.2 is a partly sectioned schematic view, illustrating the operative conditions of the machine tool of FIG.1 at the end of machining a work-piece.

In FIG.2, as the pressure liquid is delivered to the left-hand side chamber of the cylinder 40 through the passage 44, the reciprocating frame-work 12 moves rightwards, together with the die 28 secured thereto. Thus, the die 28 operatively engages the work-piece 46 in the so-called floating fashion, so as to form spline grooves 46' on the work-piece 46 by extrusion.

It should be noted here that as the die 28 travels toward the fixed holder member 27 while extruding spline grooves 46', the splined portion of the work-piece 46 tends to expand or elongate in its longitudinal direction. This elongation acts to compress the fluid in the cylinder 32 to the left of the piston 33, because the right-hand end of the work-piece 46 is held steadfastly by the fixed holder member 27. As a result, the pressure in the cylinder 32 tends to rise. The construction of the checking constant-pressure valve 36 is such that as the fluid pressure within the cylinder 32 increases on the left-hand side of the piston 33, the valve 36 releases the fluid to the outside of the cylinder 32 while allowing the piston 33 to move leftwards, as seen in FIG.2, so as to keep the fluid pressure acting on the piston 33 constant. Such movement of the piston 33 can be seen by comparing the piston positions in FIGS.1 and 2. Consequently, the work-piece 46 is allowed to elongate as it is extruded by the die 28, so that it can be accurately extruded. The inventors have confirmed that extrusions other than the illustrated splining extrusion can also be accomplished accurately by the machining tool of the invention. Furthermore, the work-piece 46 is held by constant pressure by the movable and fixed holder members throughout the entire machining operation.

Although the sum of the constant pressure from the piston 33 through the movable holder member 30 and the machining pressure from the die 28 seems to act on the fixed holder member 27, the actual load acting on the fixed holder member 27 does not exceed a reasonable limit partly due to the difference of the lateral sectional areas between the extruded portion and non-extruded portion 46'' of the work-piece 46.

Figure 3:
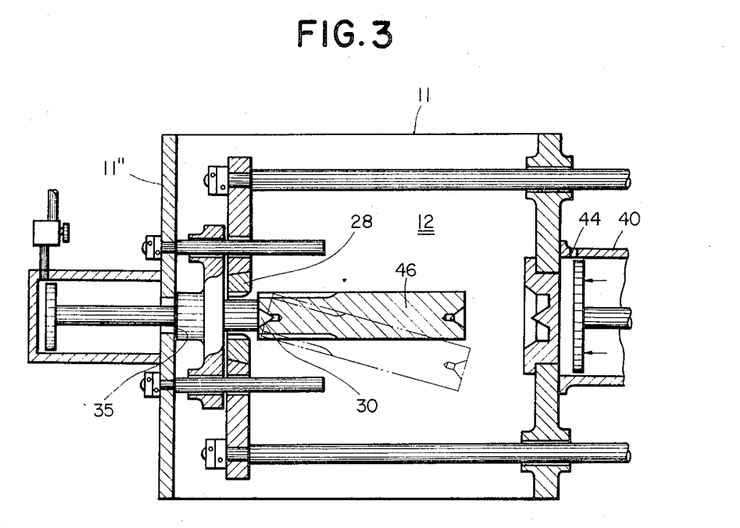
FIG.3 is a partly sectioned partial schematic view, illustrating the manner in which a finished work-piece is removed from the machine tool.

Referring to FIG.3, upon completion of the desired machining operation, pressure fluid is delivered to the right-hand chamber of the cylinder 40 through the fluid passage 45, while removing pressure fluid from the left-hand chamber through the fluid passage 44. Accordingly, the reciprocating frame-work 12 moves toward the left-hand support wall 11'' together with the machined work-piece 46 and the die 28. When the die 28 comes to a certain position relative to the center holder 29, the valve 36 is disabled, so that the center holder 29 moves toward the left-hand support wall 11'' together with the reciprocating frame-work 12, until the stopper 35 engages the left-hand support wall 11'' when the frame-work 12 comes to rest. In the course of the movement of the reciprocating frame-work 12 toward the left-hand support wall 11'', the right-hand end of the work-piece 46 leaves the fixed holder member 27 and drops out of the machine tool, as shown by phantom lines in FIG.3.

It is apparent from the foregoing description that, with the machine tool of the present invention, the work-piece is free from excessive stress throughout its extrusion despite its elongation caused by the extrusion, because one end of the work-piece is movably held at a constant pressure by the auxiliary hydraulic jack including the pressure fluid cylinder connected to the checking constant-pressure valve. The holding of the two ends of the work-piece at the constant pressure completely eliminates the risk of fatigue and breakdown of the work-piece material due to repeated vibration, which fatigue and breakdown have been experienced with conventional machine tool for similar work. Besides, with the construction of the present invention, there is no danger of cracking in the proximity of the center holes and "metal creeping" at the ends of machined portions of the work-piece. Thus, shaped products of high quality can be obtained at high dimensional accuracy.

Furthermore, with the machine tool of the present invention, the risk of adverse bending of the work-piece in the initial stage of machining due to the presence of unstable regions, which has been troublesome in conventional extrusion-type machining, can completely be eliminated, by holding the work-piece with constant holding pressure by the combination of the fixed holder member and the movable holder member. By using the holding mechanism of the present invention, the end surface of the work-piece can be formed at right angles to the machined surface, and the machined surface can be made smoothly regardless of even or uneven distribution of material in the work-piece of limited degree.

In the machine tool of the invention, the die is floating in alignment with the axis of the work-piece by the die holder of the reciprocating framework 12, so that die travels along the work-piece while keeping exact alignment with the longitudinal axis of the work-piece. Accordingly, extrusion can be effected with reference to the axis of the work-piece, without causing any eccentricity in the unstable region of the material and the bending thereof. Thus, axially long work-piece can be accurately extruded by the machine tool of the present invention, without using any extra guide dies. In addition, a highly accurate axial center line is established through the center holes in the finished product, so that such axial center line with the center holes can be advantageously used in the succeeding lathing and grinding process. Thus, the overall efficiency of the entire machining process for each product can be greatly improved.

Figure 4:
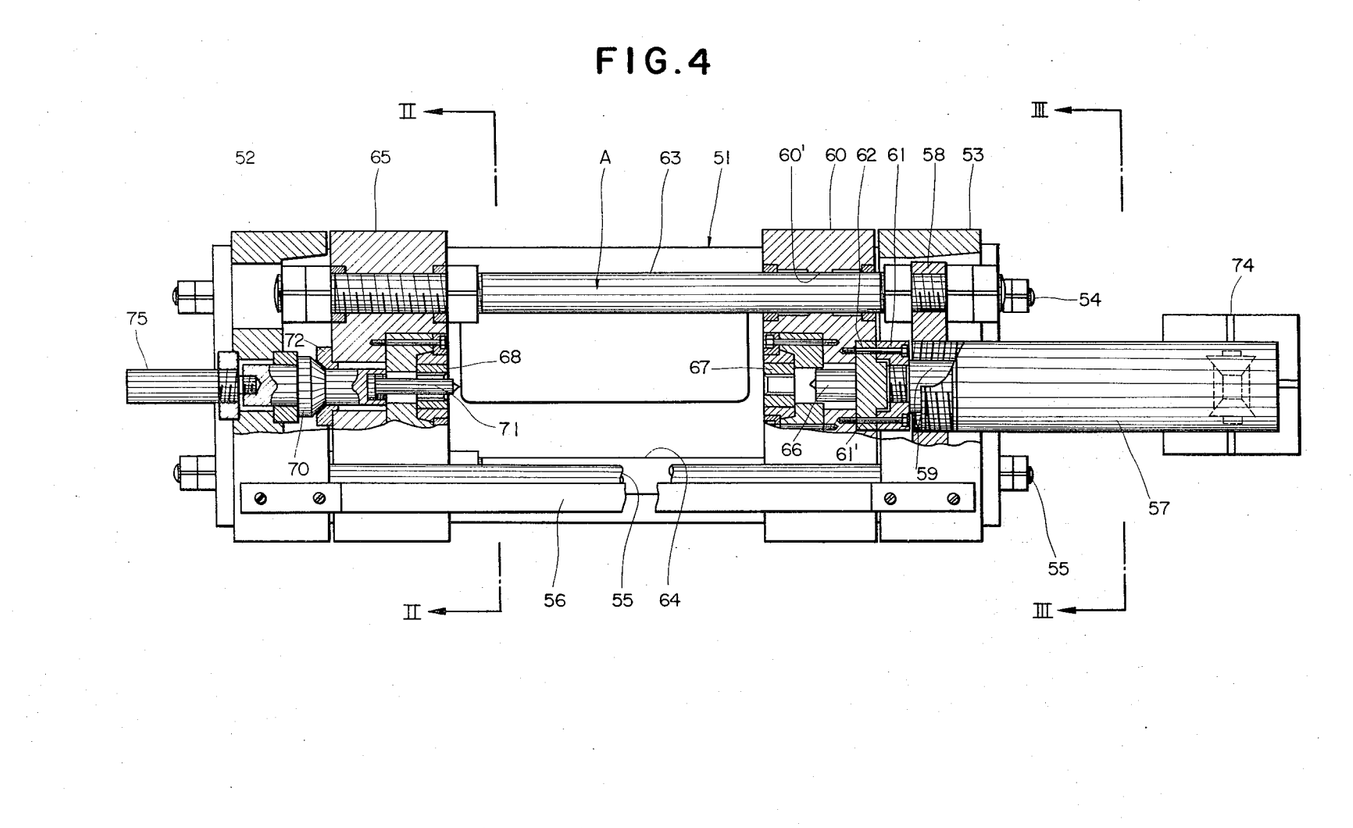
FIG.4 is a partly sectioned schematic plan view of another machine tool, according to the present invention.
Figure 5:
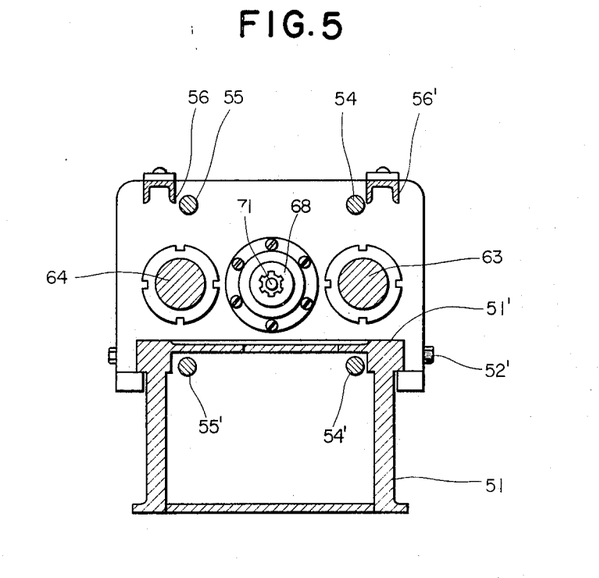
FIGS.5 and 6 are sectional views, taken along the lines II — II and III — III of FIG.4 respectively.
Figure 6:
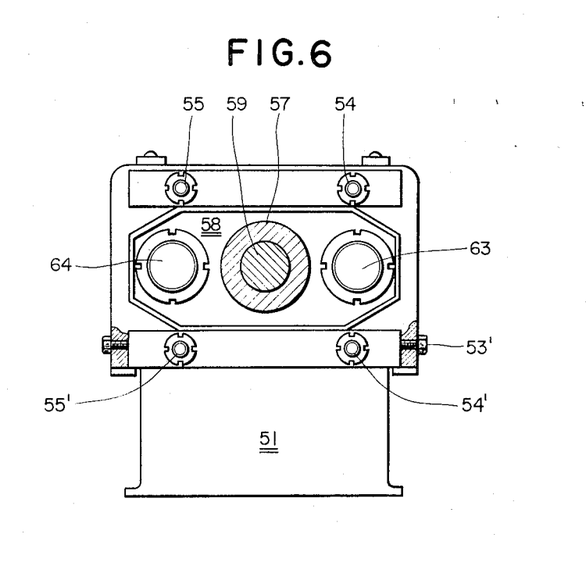

FIGS.4 to 11 illustrate another embodiment of the present invention. In FIGS.4 to 6, the machine tool of this embodiment includes a machine frame 51, to which a left-hand support wall or support member 52 and a right-hand support wall or support member 53 are secured at longitudinal ends thereof by suitable fastening means 52', 53', e.g., bolts. The right-hand support wall 53 has a hollow space or z recess which receives a movable flange or a right-hand end member of a reciprocating frame-work 58, as will be described hereinafter.

Spacing members 54, 54', 55, 55', 56, and 56' are secured to the walls 52 and 53 at the opposite ends of each spacing member respectively, so as to firmly hold the two walls 52 and 53 with a fixed spacing. The spacing members 54, 54', 55, and 55' are mainly for bearing tensile load, while the spacing members 56 and 56' are mainly for bearing compressive load.

A bolster-side or an auxiliary hydraulic jack side die holder 65 and a main ram-side or a main hydraulic jack side die holder 60 are disposed in the space defined between the two support walls 52 and 53. A movable flange 58 is disposed on the side of the right-hand support wall 53.

The bolster-side die holder 65 and the flange 58 are connected together by a pair of connector rods 63 and 64 which rods slidingly extend through a pair of guide bearings 60' provided on the main ram-side die holder 60. In the embodiment, as illustrated in FIGS. 4 to 11, the connector rods 63 and 64 extend through a hollow space of the right-hand support wall 53 without engaging the latter. The opposing ends of each connector rod 63 or 64 are integrally connected to the bolster-side die holder 65 and the flange 58, respectively, by suitable fastening means, e.g., double nuts.

The flange 58 is directly connected to a main ram cylinder 57, for instance by threaded engagement, as shown in FIG. 4. A main ram 59, which is connected to FIG. 4. piston disposed in the cylinder 57, coaxially extends through the cylinder 57 from the piston to the outside of the cylinder 57. Accordingly, the main ram 59 extends through the flange 58, and the flange 58 is movable relative to the main ram 59 together with the main ram cylinder 57. The main ram cylinder is slidably supported on a jack base 74. A tapped ring 61 engages threaded outer end of the main ram 59, and ring 61 is secured to the ram-side die holder 60 through a pad 62 by threaded bolts 61', as shown in FIG. 4 Thus, the main ram 59 is connected to the ram-side die holder 60.

A fixed holder member 66 is secured to the central portion of the ram-side die holder 60. A movable holder member 71 is connected to an auxiliary ram 69, as will be described hereinafter. The two centers 66 and 71 are secured to the machine tool in such a manner that the center 66 faces the other center 71 in alignment with each other.

The outer end of the auxiliary ram 69 is connected to one side of a center guide 70, and the opposite side of the center guide 70 holds the movable holder member 71. The center guide 70 preferably includes a large diameter portion to facilitate the selective engagement of the guide 70 with a pad 72 secured to the left-hand support wall side of the bolster-side die holder 65.

In the embodiment of FIG. 4, the bolster-side die holder 65 and the flange 68 integral with the main ram cylinder 57, which are connected together with the connector rods 63 and 64, constitutes a reciprocating frame-work A movable relative to the left- and right-hand support walls 52 and 53 steadfastly fixed to the machine frame 51. The upper portion of the ram-side die holder 60 provides for the guide bearings 60' guiding the reciprocation of the frame-work A, and the central portion of the holder 60 is connected to the main ram 59 extending from the main ram cylinder 57 and holds the fixed holder member 66, and the lower portion of the holder 60 simply sits on the smooth top surface 51' of the frame 51. A ram-side die 67 is mounted on the ram-side die holder 60 in alignment with the fixed holder member 66. It should be noted here that alignment is established in the machine tool on the frame 51 among the fixed holder member 66, the ram-side die 67, the movable holder member 71, and the bolster-side die 68.

Figure 7:
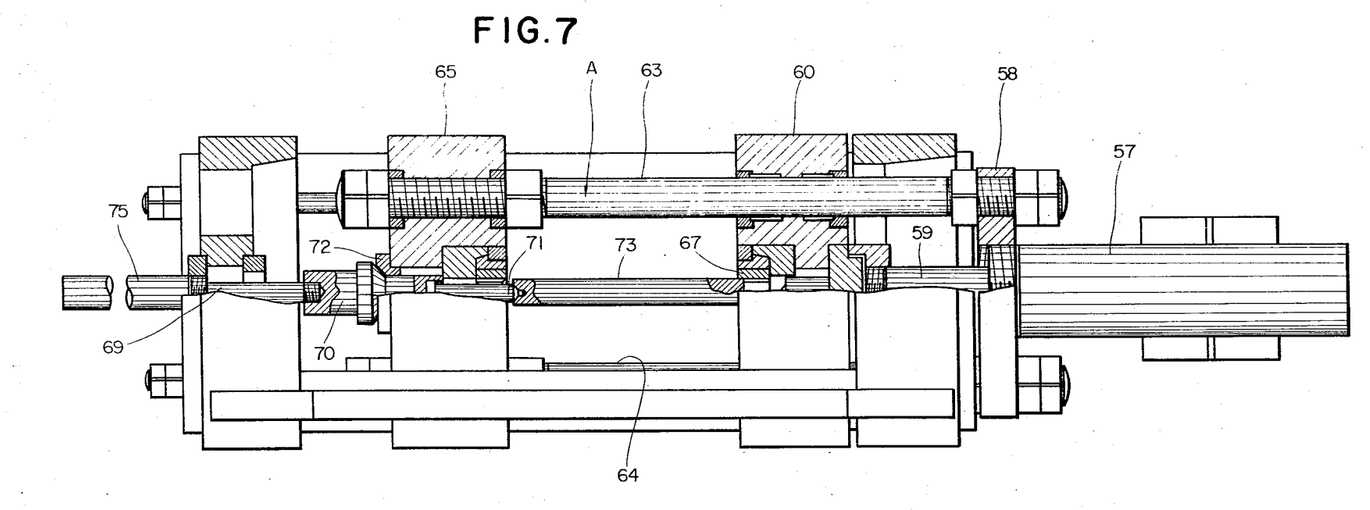
FIG.7 is a partly sectioned schematic view of the machine tool of FIG.4, shown as ready for machining with the work-piece mounted thereon.

A work-piece 73 to be machined by the machine tool of FIG. 4 is pretreated by forming center holes at its opposing end surfaces, and its diameter is made substantially equivalent to the maximum diameter D of the ram-side die 67 (FIG. 7–A).

Figure 11:
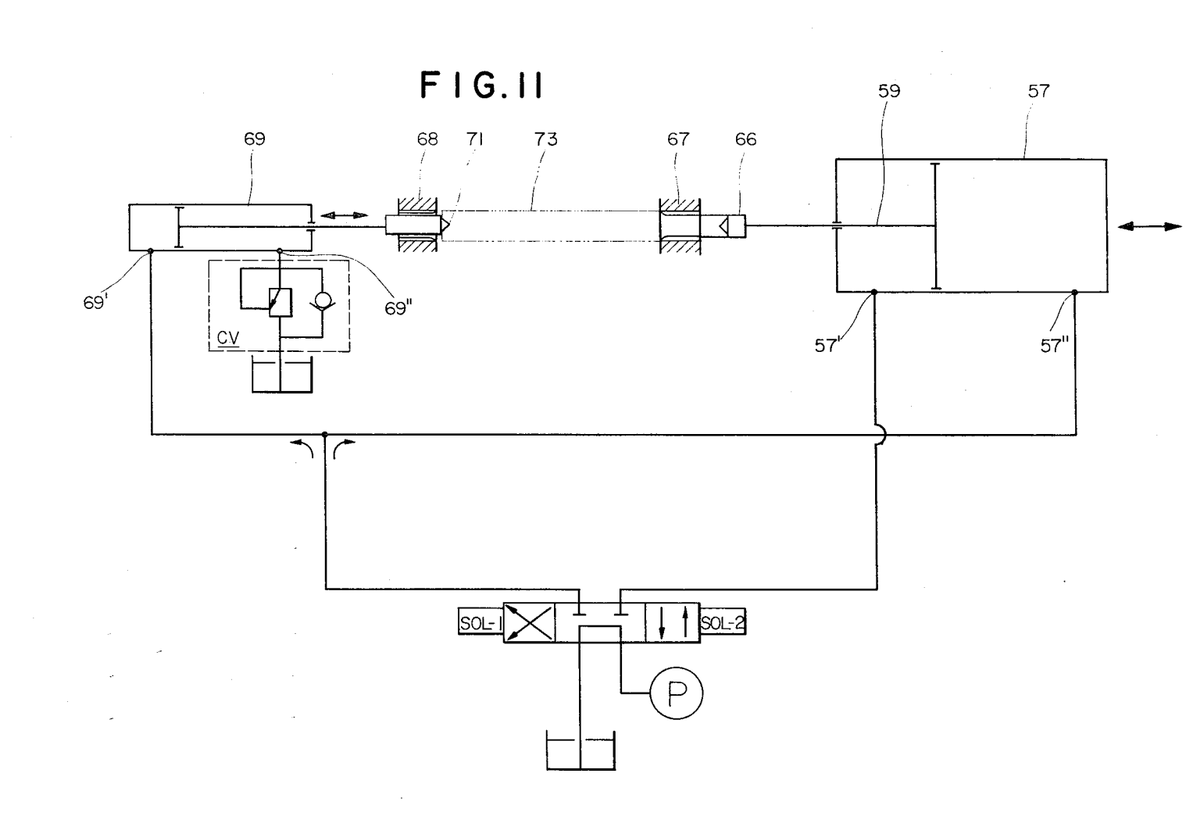
FIG.11 is a simplified block diagram of a hydraulic control system for controlling a first and second hydrolic jacks in the machine tool in FIG.4.

The operation of the machine tool of the construction as described herein-before by referring to FIGS. 4 to 6 will now be described. FIG. 7 illustrates the condition of the machine tool at the end of a first stage of the machining operation; namely, one end of the work-piece is held by the movable holder member 71, while the opposite end of the work-piece 73 engages the approach or entry of the ram-side die 67 with a spacing from the fixed holder member 66. To establish the condition of FIG. 7, the longitudinal axial center line of the pretreated work-piece is held between the die holders 60 and 65 in alingnment with the fixed holder member 66 and the movable holder member 71, by a suitable holding means (not shown), and the solenoid SOL-1 of a solenoid valve in the hydraulic control system of FIG. 11 is actuated. The construction of the solenoid valve is such that its spool moves to the right, as seen in FIG. 11, upon actuation of the solenoid SOL-1, so that pressure fluid from a pump P is delivered to the auxiliary ram cylinder 75 through its fluid inlet passage 69' so as to urge the auxiliary ram 69 to the right. At the same time, the pressure fluid from the pump P is also delivered to the main ram cylinder 57 through its fluid passage 57'', so as to apply pressure to the right-hand side of the piston of the main ram 59. Since the main ram cylinder 57 is movable while the auxiliary ram cylinder 75 is stationary, the auxiliary ram 69 moves to the right, as seen in FIGS. 4 and 11, to cause the center guide 70 to engage the pad 72 secured to the ram-side die holder 65 for moving the reciprocating frame-work A to the right, so that the flange 58 of the frame-work A travels to the right together with the main ram cylinder 57. During this movement of the main ram cylinder 57 the movable holder member 71 secured to the outer end of the auxiliary ram 69 comes into engagement with the center hole at the left-hand end of the work-piece 73, and as the auxiliary ram 69 further moves rightwards, the right-hand end of the work-piece 73 is forced to engage the approach of the ram-side die 67, as shown in FIG. 7.

Figure 8:
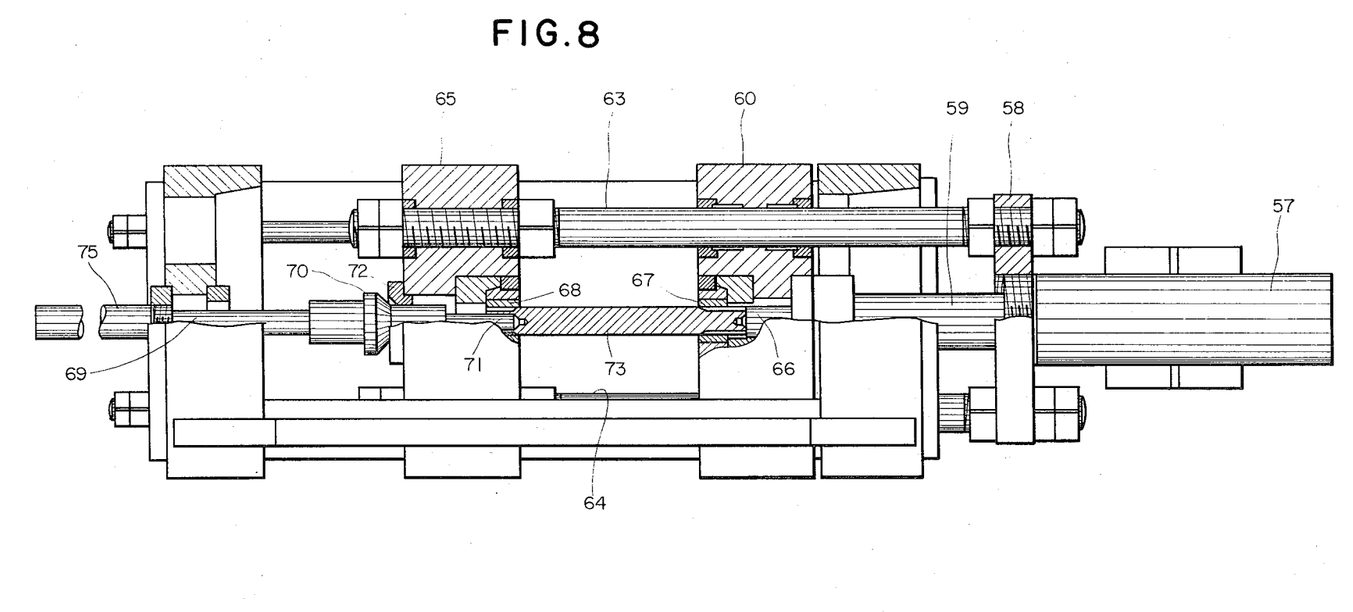
FIG. 8 is a partly sectioned plan view of the machine tool of FIG.7, showing the manner in which the right-hand part of the work-piece is machined.

FIG. 8 shows the condition of the machine tool at the end of the second stage of the machining operation, following the first stage; namely, the right-hand end portion of the work-piece 73 is machined by the ram-side 67, and the center hole at the right-hand edge surface of the work-piece 73 is brought into operative engagement with the fixed holder member 66, so as to hold the work-piece 73 by the two holder members 66 and 71 of the machine tool for allowing the removal of the work-piece holding means used in the first stage. The condition of FIG. 8 is established by the continuation of the rightward stroke of the auxiliary ram 69.

More particularly, when the right-hand end of the work-piece 73 engages the approach of the ram-side die 67 as shown in FIG. 7, as the pressure fluid is delivered to the main ram cylinder 57, the main ram cylinder 57 moves to the right together with the reciprocating frame-work A, until of the bolster-side die holder 65 causes the bolster-side die 68 to engage the left-hand edge of the work-piece 73, because the movement of the auxiliary ram 69 is resisted by the ram-side die 67. After both of the opposite ends of the work-piece 73 are brought into engagement with the dies 67 and 68, respectively, further delivery of the pressure fluid to two ram cylinders 57 75 will begin the machining operation of the work-piece 73. In this embodiment, the main ram-side die 67 is selected to begin the machining before the bolster-side die 68. Thus, in response to the further application of pressure fluid, the auxiliary ram 69 moves to the right, so as to force the work-piece 73 to the right, so that the right-hand end portion of the work-piece 73 is machined or extruded by the ram-side die 67, until the center hole formed on the right-hand edge surface of the work-piece 73 engages the fixed holder member 66. The pad 62 secured to the ram-side die holder 60 acts to limit the rightward movement of the fixed holder member 66.

It is noted that the extrusion of the right-hand end of the work-piece 73 by the main ram-side die 67 tends to generate such adverse strain in the work-piece 73 as to cause inaccuracy in the extrusion. According to the present invention, the danger of such adverse strain is completely eliminated by providing a checking constant-pressure valve CV at the auxiliary ram cylinder 75. When the resistance to the extrusion of the work-piece 73 causes the fluid pressure to rise in excess of a certain predetermined level, the valve CV acts to partially release the fluid pressure from the auxiliary ram cylinder 75, so as to maintain a substantially constant fluid pressure in the ram cylinder 75 while allowing the auxiliary ram 69 to move leftwards, as seen in FIGS.4 and 11. Thereby, the work-piece 73 is allowed to elongate, and the holding pressure at the opposite end of the work-piece 73 is kept substantially constant without causing any adverse strain in the work-piece 73.

In the second stage of the machining operation, it is apparent that the pressure fluid delivered to the main ram cylinder 57 cannot cause the main ram 59 to move to the left, because the auxiliary ram cylinder 75 having the same fluid pressure as that of the main ram cylinder 57 is held stationary while the main ram cylinder 57 itself is movable.

Figure 9:
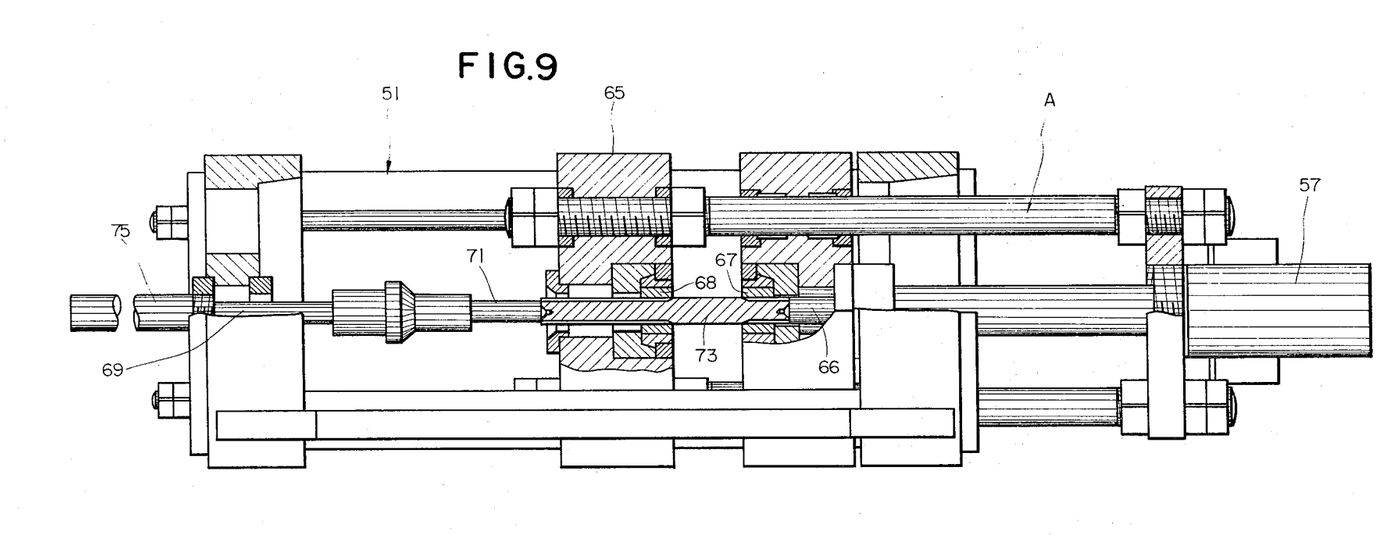
FIG. 9 is a schematic view similar to FIG.8, illustrating the manner in which the left-hand part of the work-piece is machined.

FIG.9 shows an intermediate condition of the machine tool during the third stage of the machining operation, which follows the aforesaid second stage. During the third stage, the left-hand side of the work-piece 73 is machined or extruded by the bolster-side die 68, which is now held by the two holder members 66 and 71. As the pressure fluid is continuously fed to the main ram cylinder 57, the cylinder 57 moves to the right together with the reciprocating frame-work A, because the auxiliary ram 69 cannot move rightwards due to the limitation by the pad 62 on the main ram-side die holder 60. Thereby, the bolster-side die 68 carried by the bolster-side die holder 65 of the reciprocating frame-work A extrudes the left-hand side portion of the work-piece 73, as shown in FIG.9, so as to form liner grooves 73' (FIG.9–A) of the work-piece 73 in parallel with the axis defined by the fixed holder member 66 and the movable holder member 71.

During the extrusion by the bolster-side die 68 in the third stage of the machining operation, the work-piece 73 is allowed to elongate by the action of the checking constant-pressure valve CV. Thereby, the danger of adverse strain on the work-piece 73 is completely eliminated, and the holding pressure is kept substantially constant for ensuring highly accurate machining of the work-piece 73, while maintaining exact axis on a line connecting the fixed holder member 66 and the movable holder member 71.

When the desired length of the work-piece 73 is machined, the third stage of the machining is completed, for instance by a limit switch (not shown) which de-energize the solenoid SOL–1 of the solenoid valve in the hydraulic system of FIG.11.

Throughout the second stage (FIG.8) and the third stage (FIG.9) of the machining, even if unbalanced strain is caused in unstable regions of the work-piece 73 by the die 67 or 68, the constant holding pressure at the two holder members 66 and 71 prevents the work-piece 73 from deviating from the axis defined by the two holder members 66 and 71, which engages preformed center holes of the work-piece 73, respectively.

It should be noted here that the ram-side die holder 60 and bolster-side die holder 65 are both slideably disposed on the machine frame 51, so that each of the two holders 60 and 65 can move on the machine frame 51 to a limited extent. For instance, in the case of slight flexing of the work-piece 73, either holder 60 or 65 can move slightly in parallel with the axial center line of the work-piece 73, as defined by the fixed holder member 66 and the movable holder member 71, so that effective extrusion by the die 67 or 68 can be ensured.

Figure 10:
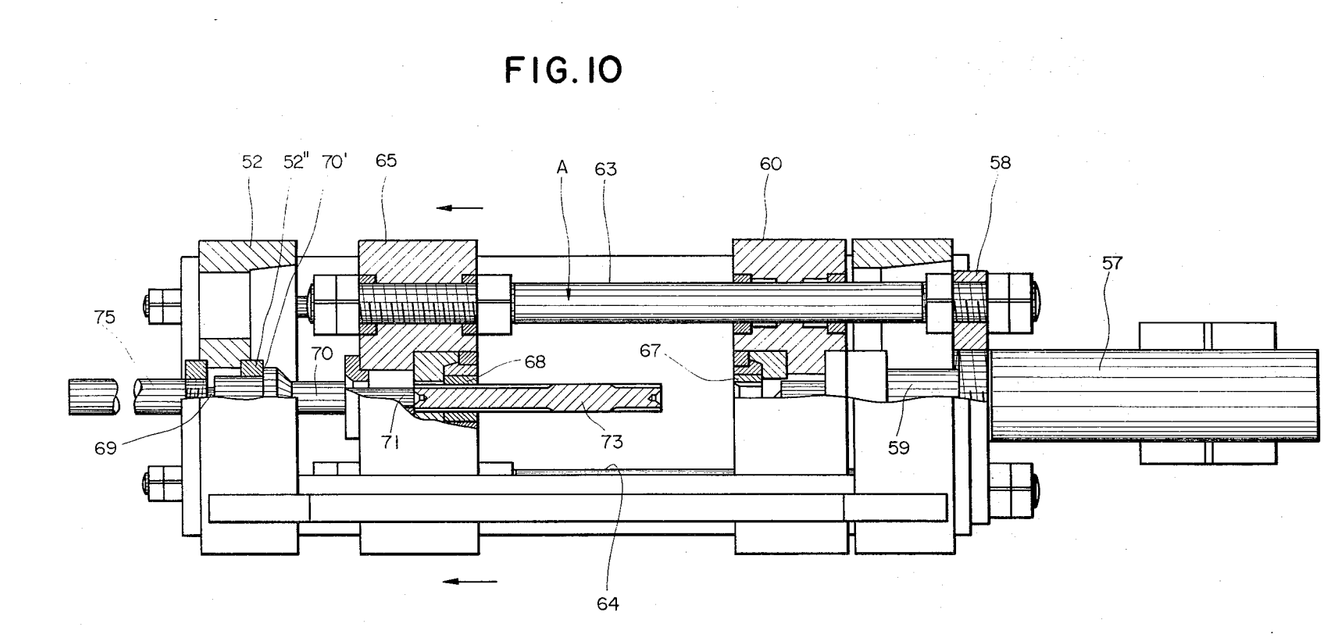
FIG.10 is a partly sectioned plan view, showing the manner in which the work-piece is removed from the machine tool after being machined.

FIG.10 shows an intermediate condition of the machine tool during the fourth stage of machining operation. When the end of the third stage is detected, e.g., by the aforesaid limit switch, another solenoid SOL–2 of the solenoid valve in the hydraulic control system of FIG.11 is energized. Accordingly, the right-hand end of the valve spool is connected to the hydraulic system, so that the pressure fluid is drained from the auxiliary ram cylinder 75, through the opening 69' and from the right-hand chamber of the main ram cylinder 57 through the fluid passage 57'', while delivering the pressure fluid to the left-hand side chamber of the main ram cylinder 57 at the left-hand side of the piston through the passage 57'. Thus, the main ram cylinder 57 moves leftwards together with the reciprocating frame-work A, while forcing the auxiliary ram 69 to the left, as shown in FIG.10. In the beginning of this leftward movement of the reciprocating frame-work A, the ram-side die holder 60 tends to move together with the work-piece 73, but due to the inertia of the holder 60 and the main ram 59 connected thereto and the related friction, the ram-side die holder 60 remains stationary and the work-piece 73 leaves the ram-side die 67 carried by the holder 60. The reaction of the leftward movement of the main ram cylinder 57 is transmitted to the main ram 59, so as to urge the ram-side die holder 60 against the stationary right-hand support wall 53 secured to the machine frame 51 for facilitating the separation of the work-piece 73 from the ram-side die 67 carried by the holder 60. The bolster side die 68 moves leftwards together with the work-piece 73.

When the flange portion 70' of the center guide 70 carrying the movable center 71 engages a strap 52'' mounted on the left-hand first support wall 52, the auxiliary ram 69 comes to rest together with the movable holder member 71 and the work-piece 73, but the bolster-side die holder 65 continues its leftward movement. As the right-hand edge of the bolster-side die 68 on the bolster-side die holder 65 passes the left-hand edge of the work-piece 73, the movable holder member 71 knocks out the work-piece 73 for removal from the machine tool by a suitable means. When the bolster-side die holder 65 returns to its extreme left position, or its initial position as shown in FIG.4, the solenoid SOL–2 is de-energized by a suitable means (not shown) and one machining cycle is completed, and the machine tool becomes ready for a nexts machining operation.

As described in the detailed disclosure of the construction and operation of the machine tool of the invention, the machine tool can accurately extrude a work-piece having preformed center holes into desired shape, such as a splined shaft, a cylindrical gear, a fluted roller, or the like, because the elongation of the work-piece caused by the extrusion is automatically absorbed by the auxiliary ram 69 provided with a checking constant-pressure valve CV while maintaining a constant holding pressure. The extrusion of the work-piece 73 in parallel with its longitudinal axis, is defined across the holder members, 66 and 71, by means of the dies 67 and 68 carried by the holders 60 and 65 ensures accurate machining of the long work-piece with a well established concentricity, and such extrusion eliminates the need of extra guide dies which have been required in conventional machine tool for similar purposes. Furthermore, the constant holding pressure of the work-piece by the fixed holder member and the movable holder member completely eliminates the danger of flexing of the work-piece at its unstable regions and the "metal creepage" at its end portions. Thus, the need of providing extra metal at end portions of the work piece before machining and the removal of such extra metal after the machining is entirely eliminated, so that the manhours necessary for such machining can greatly be reduced. Since the center holes of the work-piece are not affected by the machining with the machine tool of the invention while maintaining an accurate axis therethrough, such center holes can be used in succeeding finishing treatment of the work-piece, such as finishing by lathing and grinding. Thus, the laborious centering of the toothed work-piece for the finishing operation and the accompanying boring of the center holes become unnecessary, so that the ecomonomy of the material is greatly improved while simplifying the finishing process. Consequently, with the machine tool of the present invention, the machining and extruding operation can be remarkably simplified, as compared with conventional machine tools.

If the machine tool of the present invention is provided with a suitable work-piece feeder and a work-piece remover, it can be used for mass production with further saving in the manhours.

Although the present invention has been described with a certain degree of particularity, it is understood that the present disclosure has been made only by way of example and that numerous changes in details of construction and the combination and arrangement of parts may be resorted to without departing from the spirit and the scope of the invention as hereinafter claimed.

What I claim is:

1. Machine tool for working an extendedly long work-piece such as a steel bar into a splined shaft, fluted rod, axially thick pinion or the like by means of a die adapted to be axially moved relative to said work-piece, comprising a machine frame, a first hydraulic jack mounted at one end of said machine frame, a frame-work adapted to be reciprocatingly movable along on said machine frame by means of said first hydraulic jack, said frame-work being provided with the die at the inner end thereof, a fixed holder member having a center pin to engage with a center hole formed in one end of the work-piece, a movable holder member having a center pin to engage with the opposite center hole of the work-piece, a second hydraulic jack mounted at the other end of said machine frame and having a piston connected to said movable holder member, a source of fluid under pressure, and conduit means for connecting said fluid pressure source with said first hydraulic jack and through a check valve with second hydraulic jack, whereby when said first hydraulic jack is actuated so as to move said frame-work in one direction, said die may be forcedly pulled along on the work-piece to shape said work-piece while compensating for elongation caused by said shaping by means of elasticity of the second hydraulic jack, which elasticity may be controlled by said check valve.

2. Machine tool as set forth in claim 1, in which said machine frame is provided with two support members on the opposite ends thereof and said reciprocatingly movable frame-work comprises two end members and at least one pair of parallel beams for connecting said end members together, one of said support members of the machine frame having bearing for journalling said beams of the frame-work for longitudinal movement in either direction thereof and being fixedly provided with said holder member with the center pin and further a cylinder of said first hydraulic jack of which piston is connected via its piston rod with one of said end members of the frame-work so as to be moved in either direction depending on which chamber of the cylinder the fluid under pressure is supplied, the other support member of the machine frame being provided with a cylinder of said second hydraulic jack so as to extend its piston rod toward said fixed holder member with the center pin, the free end of said piston rod having the movable holder member with its center pin so as to elastically hold the work-piece together with said fixed center pin therebetween, the other end member of the frame-work being mounted with the die so as to allow the movable holder and the work piece engaged therewith to pass through said die.

3. Machine tool as set forth in claim 1, in which said machine frame is provided with two support members on the opposite ends thereof and said reciprocatingly movable frame-work comprises two end members and at least one pair of parallel beams for connecting said end members together, one of said support members of the machine frame having bearings for journalling said beams of the frame-work for longitudinal movement in either direction thereof and having said holder member with its center pin fixed therewith and further having a piston rod of said first hydraulic jack of which cylinder is fixed to the outer side of said one end member of the frame-work so as to be moved in either direction depending on which chamber of the cylinder the fluid under pressure is supplied, the other support member of the machine frame being provided with a cylinder of said second hydraulic jack so as extend its piston rod toward said fixed holder member with the center pin for elastically holding the work-piece together with said fixed center pin therebetween, the other end member of the frame-work being mounted with the die so as to allow the movable holder and the work-piece engaged therewith to pass through said die.

4. Machine tool as set forth in claim 3, which further comprises a second die mounted at said one support member in alignment with the first die and the two center pins so that the work-piece held by the movable center pin at one end and by an enlarged mouth of said second die at the other end may be worked first until said other end of the work-piece abuts on the fixed center pin by means of said second die, and second, with the work piece now held between the two center pins, worked at the other end by means of said first die.

* * * * *